(12) United States Patent
Chaen (10) Patent No.: US 10,158,187 B1
(45) Date of Patent: Dec. 18, 2018

(54) CONDUCTOR MODULE ATTACHMENT STRUCTURE

(71) Applicant: YAZAKI CORPORATION, Tokyo (JP)

(72) Inventor: Takahiro Chaen, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/000,863

(22) Filed: Jun. 5, 2018

(30) Foreign Application Priority Data

Jun. 16, 2017 (JP) ................. 2017-118925

(51) Int. Cl.
*H01R 13/42* (2006.01)
*H01M 2/20* (2006.01)

(52) U.S. Cl.
CPC ............ *H01R 13/42* (2013.01); *H01M 2/204* (2013.01)

(58) Field of Classification Search
CPC ......... H01R 13/42; H01R 13/40; H01M 2/20; H01M 2/202; H01M 2/204; H01M 2/206; H01M 10/482
See application file for complete search history.

(56) References Cited

U.S. PATENT DOCUMENTS

| | | | | |
|---|---|---|---|---|
| 6,423,441 B1* | 7/2002 | Ronning | ............... | H01M 2/202 361/748 |
| 2011/0064987 A1* | 3/2011 | Ogasawara | ........... | H01M 2/206 429/121 |
| 2014/0305698 A1* | 10/2014 | Ishikawa | ............. | H01M 2/1077 174/72 B |
| 2014/0308560 A1* | 10/2014 | Takishita | ............... | H01M 2/206 429/121 |
| 2014/0311768 A1* | 10/2014 | Takishita | ............. | H01R 13/447 174/66 |
| 2015/0263394 A1* | 9/2015 | Yoshioka | ............ | H01M 2/1077 429/90 |
| 2015/0303435 A1* | 10/2015 | Ikeda | .................... | H01M 2/206 429/121 |
| 2015/0372281 A1* | 12/2015 | Ogasawara | ......... | H01M 10/482 439/212 |
| 2016/0064718 A1* | 3/2016 | Imai | ....................... | H01M 2/06 429/121 |
| 2016/0126601 A1* | 5/2016 | Ichikawa | ............ | H01M 10/486 374/152 |

(Continued)

FOREIGN PATENT DOCUMENTS

JP        2012-74338 A        4/2012

*Primary Examiner* — Hoa C Nguyen
*Assistant Examiner* — Amol Patel
(74) *Attorney, Agent, or Firm* — Kenealy Vaidya LLP (57) ABSTRACT

A conductor module attachment structure includes a case having a connection conductor, a recessed groove that is provided protrusively on an outer wall of the case, a protector that extends along the recessed groove and is formed into a U-shape and that is configured that an opening portion of a U-groove of the protector is closed by an inner wall face of the recessed groove when the protector is inserted into the recessed groove, a voltage detecting line that is routed in the U-groove of the protector, a voltage detecting terminal that is connected to one end of the voltage detecting line, a terminal retaining portion that is provided on the protector and positions the voltage detecting terminal contactably with the connection conductor.

4 Claims, 7 Drawing Sheets

(56) References Cited

U.S. PATENT DOCUMENTS

2016/0172647 A1* 6/2016 Okiga ................... H01M 2/206
  429/7
2017/0328783 A1* 11/2017 Okamoto ................. G01K 1/14

* cited by examiner

CONDUCTOR MODULE ATTACHMENT STRUCTURE

CROSS REFERENCE TO RELATED APPLICATIONS

This application is based on Japanese Patent Application (No. 2017-118925) filed on Jun. 16, 2017, the contents of which are incorporated herein by reference.

BACKGROUND OF THE INVENTION

1. Field of the Invention

The present invention relates to a conductor module attachment structure.

2. Description of the Related Art

In an electrical storage device having a plurality of single batteries, of adjacent ones of the single batteries arranged in a predetermined form, a positive electrode of one single battery and a negative electrode of the other single battery are electrically connected in series with each other by a connection conductor. In addition, in the electrical storage device having the plurality of single batteries, it is necessary to grasp states of the respective single batteries in order to avoid overcharge/overdischarge of the electrical storage device. To this end, each of the single batteries is electrically connected for detecting a terminal voltage of the single battery.

For example, an electrical storage device disclosed in JP-A-2012-74338 includes a voltage detecting substrate having voltage detecting lines, a side plate retaining a plurality of battery cells (single batteries), and a plurality of busbars (connection conductors) electrically connecting the plurality of battery cells in series with each other respectively. The plurality of busbars are disposed on an opposite side face to a batter cell retention side face of the side plate. The voltage detecting substrate is disposed on the plurality of busbars. Thus, the plurality of bus bars are interposed and held between the side plate and the voltage detecting substrate.

According to the configuration, it is unnecessary to mount the busbars or the voltage detecting lines one by one on the side plate. Accordingly, it is possible to expect an improvement in assembling workability or productivity of the electric storage device.

In the electrical storage device according to the background art, the plurality of busbars are interposed and held between the side plate and the voltage detecting substrate. Therefore, the busbars or the voltage detecting substrate is exposed so that a side cover or a cover member for covering the busbars or the voltage detecting substrate is however required. On the other hand, in another structure in which voltage detecting lines are connected to battery cells respectively, a hinge cover for covering the voltage detecting lines is necessarily formed on a case (housing) in which the voltage detecting lines are routed. When such an insulating cover (the side cover or the cover member) as a separate component or such a hinge cover is provided, the structure becomes complicated and wiring work becomes troublesome. As a result, the number of work man-hours or cost increases.

The present invention has been accomplished in consideration of the aforementioned circumstances.

SUMMARY OF THE INVENTION

An object of the present invention is to provide a conductor module attachment structure in which it is unnecessary to form a hinge cover on a case or provide an insulating cover as a separate component so that it is possible to reduce the number of work man-hours or cost.

The foregoing object according to the present invention is achieved by the following configurations.

(1) Provided is a conductor module attachment structure including: a case which includes a connection conductor for electrically connecting a plurality of single batteries; a recessed groove which is provided protrusively on an outer wall of the case and extends along the outer wall; a protector which extends along the recessed groove and is formed into a U-shape in section perpendicular to a longitudinal direction of the protector so as to have a U-groove and which is configured that an opening portion of the U-shape is closed by an inner wall face of the recessed groove when the protector is inserted into the recessed groove; a voltage detecting line which is routed in the U-groove of the protector; a voltage detecting terminal which is connected to one end of the voltage detecting line; and a terminal retaining portion which is provided on the protector and which leads the one end of the voltage detecting line out of the U-groove of the protector in the recessed groove, and positions the voltage detecting terminal contactably with the connection conductor.

According to the conductor module attachment structure having the aforementioned configuration (1), when the protector to which the voltage detecting line with the voltage detecting terminal has been attached preliminarily is inserted into the recessed groove of the case, the protector is completely mounted. Thus, the voltage detecting line is completely housed. Simultaneously, the voltage detecting terminal is completely ready for connection to the connection conductor. Therefore, an insulating cover (a side cover or a cover member) as a separate component, a hinge cover, or the like, only for the purpose of covering the exposed voltage detecting line can be dispensed with. As a result, the structure can be made simple. In addition, troublesome electric wire housing work of attaching the insulating cover or locking the hinge cover after the voltage detecting line is routed can be dispensed with. As a result, voltage detecting line routing work can be performed easily. Further, the voltage detecting terminal is positioned simultaneously with the mounting of the protector. Accordingly, a complicated terminal positioning structure for positioning the voltage detecting terminal relatively to the connection conductor also does not have to be formed in the case. As a result, the structure of the case can be made simple and the voltage detecting terminal can be positioned easily.

(2) Provided is a conductor module attachment structure according to the aforementioned configuration (1), wherein: a positioning rib which extends in an insertion direction of the protector into the recessed groove is provided protrusively on the recessed groove of the case; and a positioning recess which is configured to engage with the positioning rib to position an attachment position of the protector relatively to the case is provided on the protector.

According to the conductor module attachment structure having the aforementioned configuration (2), when the protector to which the voltage detecting line with the voltage detecting terminal has been attached preliminarily is inserted into the recessed groove of the case, the positioning recess of the protector is engaged with the positioning rib of the case. Due to the engagement between the positioning recess and the positioning rib, the protector is positioned in a prescribed position relatively to the case. When the protector is positioned thus, the voltage detecting terminal retained in the terminal retaining portion is brought into a contactable state with a prescribed position of the connection conductor provided in the case.

(3) Provided is a conductor module attachment structure according to the aforementioned configuration (1) or (2), wherein: a jumping-out restraining claw which restrains the routed voltage detecting line from jumping out is provided at the U-groove in the protector.

According to the conductor module attachment structure having the aforementioned configuration (3), the voltage detecting line routed in the U-groove of the protector is restrained from jumping out of the U-groove by the jumping-out restraining claw provided in the U-groove. As a result, the voltage detecting line can be prevented, for example, from getting stuck when the protector to which the voltage detecting line with the voltage detecting terminal has been attached preliminarily is inserted into the recessed groove. Thus, insertion workability of the protector can be made excellent.

(4) Provided is a conductor module attachment structure having any one of the aforementioned configurations (1) to (3), wherein: a lock mechanism which restrains the protector from separating from the recessed groove is provided between the case and the protector.

According to the conductor module attachment structure having the aforementioned configuration (4), when the protector to which the voltage detecting line with the voltage detecting terminal has been attached preliminarily is inserted into the recessed groove completely, the protector is restrained from separating from the recessed groove by the lock mechanism. Since the lock mechanism locks the protector into the recessed groove thus, the lock mechanism retains the voltage detecting line in a protected state and retains the voltage detecting terminal in a positioned state relatively to the connection conductor.

According to the conductor module attachment structure according to the present invention, it is unnecessary to form a hinge cover on a case or provide an insulating cover as a separate component so that it is possible to reduce the number of work man-hours or cost.

The present invention has been described above briefly. Further, when a mode (hereinafter referred to as "embodiment") for carrying out an undermentioned invention is read through with reference to the accompanying drawings, details of the present invention can be made clearer.

DETAILED DESCRIPTION OF THE EXEMPLARY EMBODIMENTS

An embodiment according to the present invention will be described below with reference to the drawings.

Figure 1:
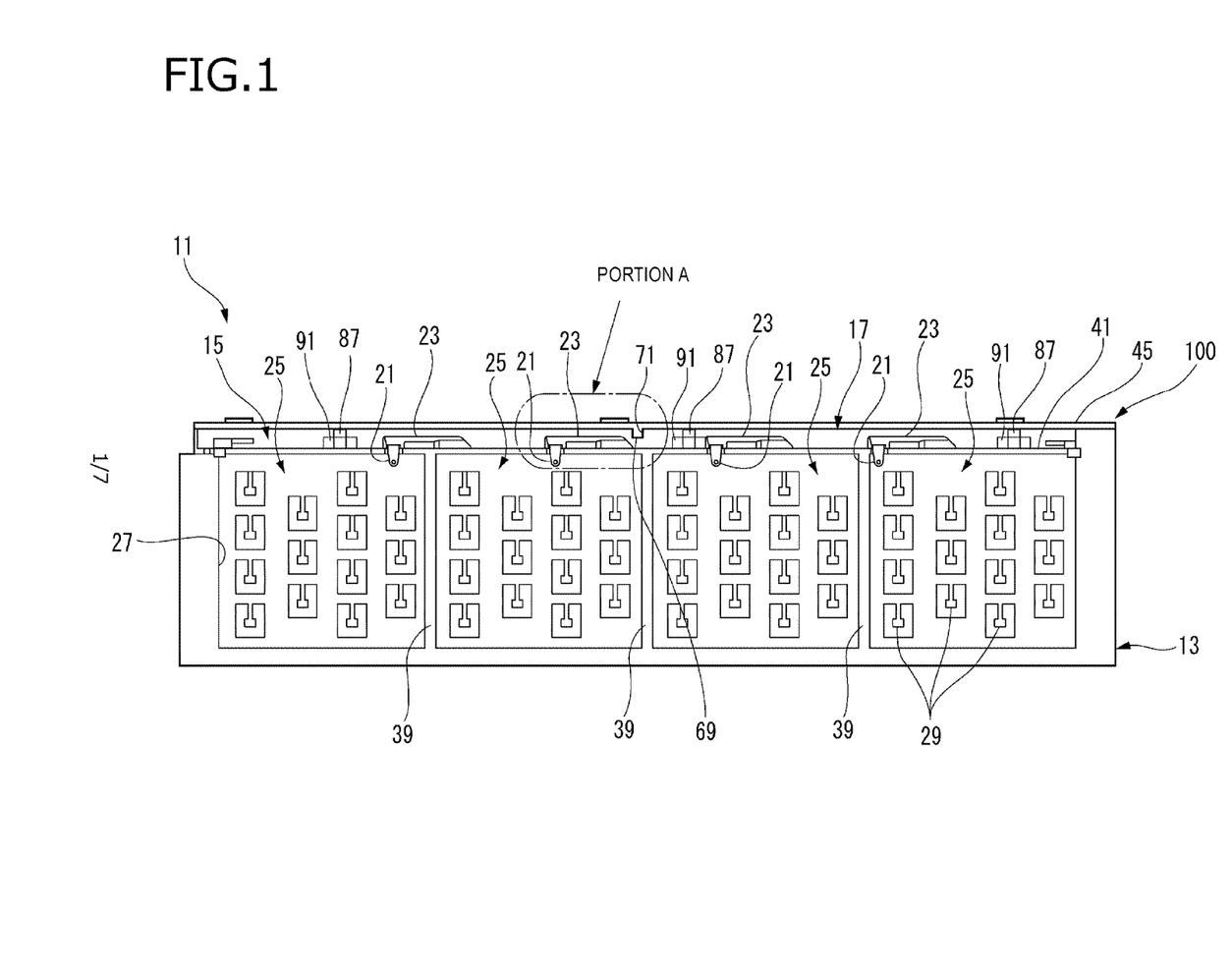
FIG. 1 is a plan view of a battery pack provided with a conductor module attachment structure according to an embodiment of the present invention.
Figure 2:
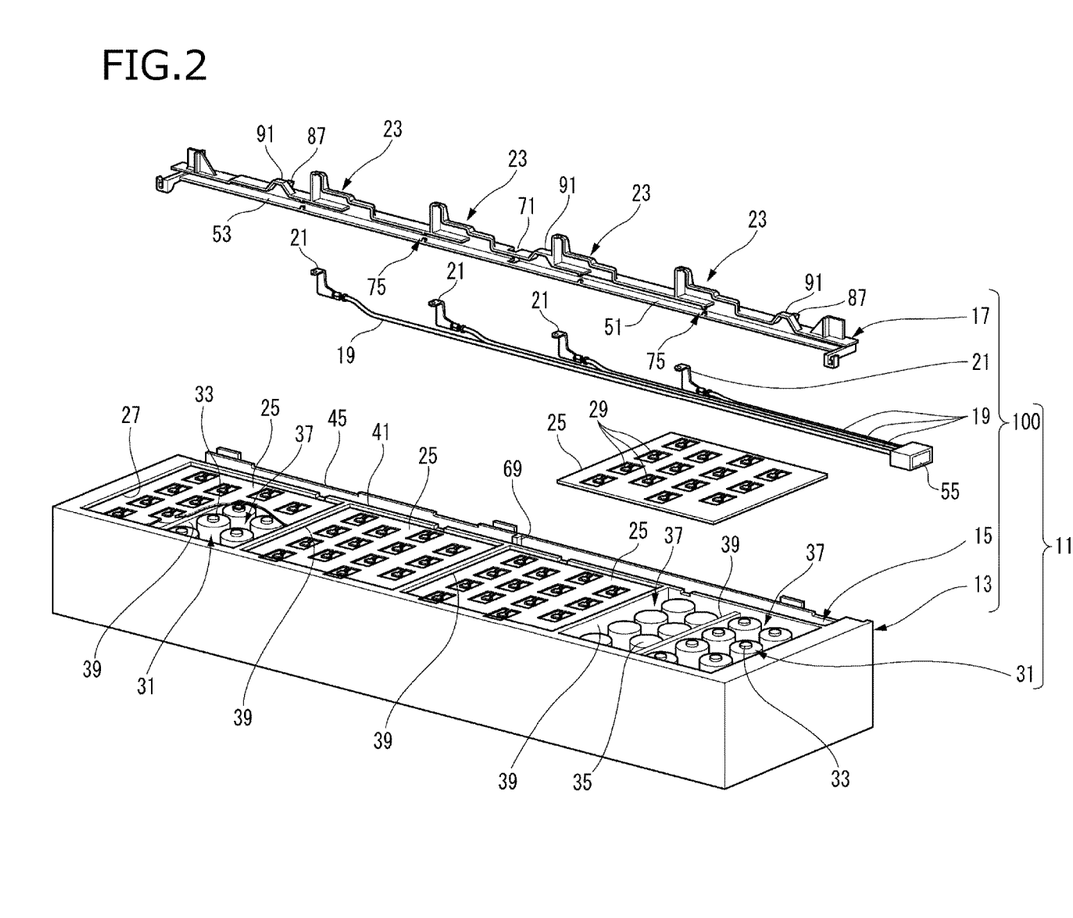
FIG. 2 is an exploded perspective view of a conductor module shown in FIG. 1.

FIG. 1 and FIG. 2 are a plan view and an exploded perspective view of a battery pack 11 provided with a conductor module attachment structure according to the embodiment of the present invention.

The conductor module attachment structure according to the embodiment is suitably used for the battery pack 11 having a plurality of single batteries 31.

As shown in FIG. 1 and FIG. 2, the battery pack 11 includes a conductor module 100. The conductor module 100 has a case 13, a recessed groove 15, a protector 17, voltage detecting lines 19, and voltage detecting terminals 21, as main constituents. The plurality of single batteries 31 are housed in the case 13. The recessed groove 15 is provided in the case 13. The protector 17 is inserted into the recessed groove 15. The voltage detecting lines 19 are routed in the protector 17. The voltage detecting terminals 21 are connected to one ends of the voltage detecting lines 19.

The case 13 includes connection conductors 25 for electrically connecting the plurality of single batteries 31. The case 13 is formed into an opened cuboidal box shape whose upper and lower faces serve as conductor placement spaces 27 where the connection conductors 25 are placed. For example, the case 13 can be made of an insulating resin. In the upper-face conductor placement space 27, a plurality of connection conductors 25 each of which is formed into an approximately square plate shape are attached to be arranged side by side in a longitudinal direction of the case 13. In the embodiment, four connection conductors 25 are attached. However, the number of the connection conductors 25 is not limited to four. On the other hand, in the lower-face conductor placement space 27 which is not shown, a plurality of connection conductors 25 and approximately rectangular connection conductors are attached to be arranged side by side in the longitudinal direction of the case 13.

A plurality of terminal portions 29 are formed in four rows in each of the connection conductors 25. The plate-like connection conductor 25 is bored at portions surrounding the respective terminal portions 29. In this manner, the respective terminal portions 29 are formed as elastically flexible pieces integrally with the connection conductor 25. The terminal portions 29 in the rows correspond to arrangement of the single batteries 31 housed in the case 13. In the embodiment, the numbers of the terminal portions 29 arranged in the first row, the second row, the third row and the fourth row from a left side of FIG. 1 are four, three, four and three respectively.

The respective connection conductors 25 are retained in the conductor placement space 27 of the case 13. The connection conductors 25 can be retained, for example, by locking claws etc. (not shown) formed in the case 13. The connection conductors 25 retained thus cover the circularly cylindrical single batteries 31 housed in the case 13. Each of the single batteries 31 has one axial end serving as a positive electrode 33, and the other axial end serving as a negative electrode 35.

The case 13 is partitioned into eight single-battery housing chambers 37 by partition walls 39. Seven single batteries 31 arranged in two rows are housed in each of the eight single-battery housing chambers 37.

In the first single-battery housing chamber 37 from the left side of FIG. 2, the single batteries 31 are housed with their negative electrodes 35 up. In the second single-battery housing chamber 37, the single batteries 31 are housed with their positive electrodes 33 up. In the following single-battery housing chambers 37, the single batteries 31 are housed with their negative electrodes 35 and positive electrodes 33 up alternately. Accordingly, each of the connection conductors 25 is set to be laid over adjacent ones of the single battery-housing chambers 37 of the conductor placement space 27. Thus, seven single batteries 31 with their negative electrodes 35 up are connected in series with seven single batteries 31 with their positive electrodes 33 up. Incidentally, the rectangular connection conductors set in the single-battery housing chambers 37 positioned at longitudinally opposite ends of the lower-face conductor placement space 27 serve as a total positive electrode and a total negative electrode respectively.

The recessed groove 15 is protrusively provided on an outer wall 41 of the case 13 and extends along an upper end edge of the outer wall 41. The recessed groove 15 is constituted by the outer wall 41, a bottom wall 43, and a side wall 45. The bottom wall 43 is formed to protrude perpendicularly from the outer wall 41 of the case 13 and laid in the longitudinal direction of the case 13. The side wall 45 erects perpendicularly from a protruding front end of the bottom wall 43. Accordingly, the recessed groove 15 forms a groove space between the outer wall 41 and the side wall 45 with interposition of the bottom wall 43 therebetween. Accordingly, the groove space is surrounded by an inner wall face 47 (see FIG. 7) including the outer wall 41, a bottom wall face 49 and the side wall 45.

The protector 17 is formed to be long along the recessed groove 15 of the case 13 and into a U-shape in section perpendicular to the longitudinal direction. For example, the protector 17 can be made of an insulating resin. In the embodiment, the protector 17 is formed into a sideways U-shape in section in which an opening portion 53 of a U-groove 51 is opened in a side face. The protector 17 is inserted into the recessed groove 15 in a direction forming the sideways U-shape. Thus, the opening portion 53 of the U-groove 51 is closed by the inner wall face 47 which is an opposite side face to the connection conductors 25 in the outer wall 41 of the recessed groove 15.

Incidentally, the protector 17 may be formed to be inserted in a direction forming an inverted U-shape in section in which the opening portion 53 of the U-groove 51 serves as a lower face. In addition, the protector 17 may be configured to be inserted in a direction in which the opening portion 53 of the U-groove 51 is closed by the inner wall face 47 which is an inner face of the side wall 45 of the recessed groove 15. That is, the protector 17 can be formed in any form as long as the opening portion 53 of the U-groove 51 is closed by the inner wall face 47 when the protector 17 is inserted into the recessed groove 15 of the case 13.

Figure 3:
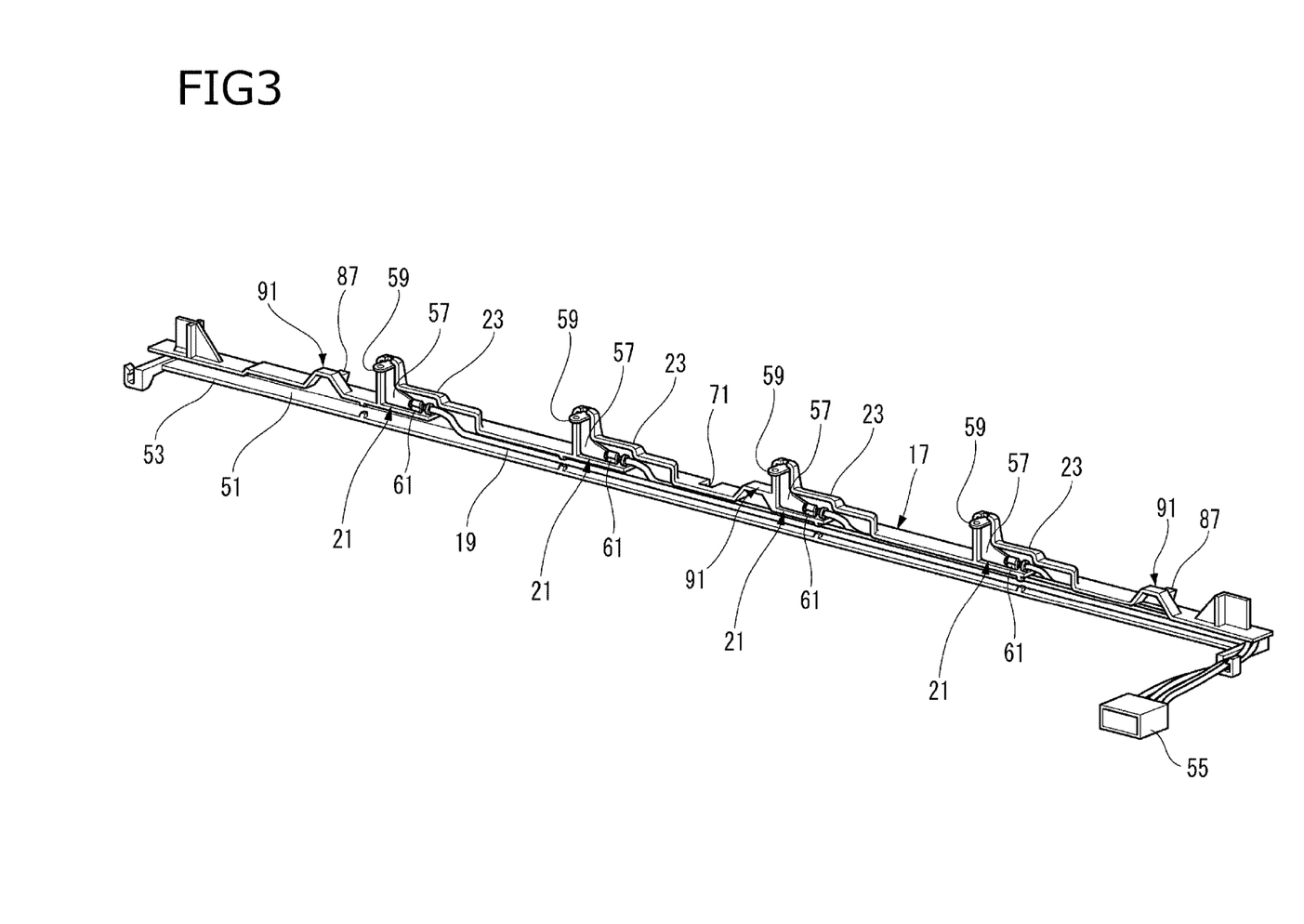
FIG. 3 is a perspective view of voltage detecting lines routed in a protector shown in FIG. 2.

FIG. 3 is a perspective view of the voltage detecting lines 19 routed in the protector 17 shown in FIG. 2.

The voltage detecting lines 19 are routed in the U-groove 51 of the protector 17. The voltage detecting lines 19 are housed in the protector 17 correspondingly to the connection conductors 25 respectively. Accordingly, in the embodiment, four voltage detecting lines 19 are routed in the U-groove 51 of the protector 17. The voltage detecting terminals 21 are connected to one ends of the four voltage detecting lines 19 respectively. The voltage detecting lines 19 have the one ends to which the voltage detecting terminals 21 are connected, and the other ends which are collectively connected to a voltage detecting connector 55. The voltage detecting terminals 21 are connected to a battery monitoring unit (not shown) through the voltage detecting lines 19 and the voltage detecting connector 55 in order to transmit voltage information of the respective connection conductors 25.

Figure 4:
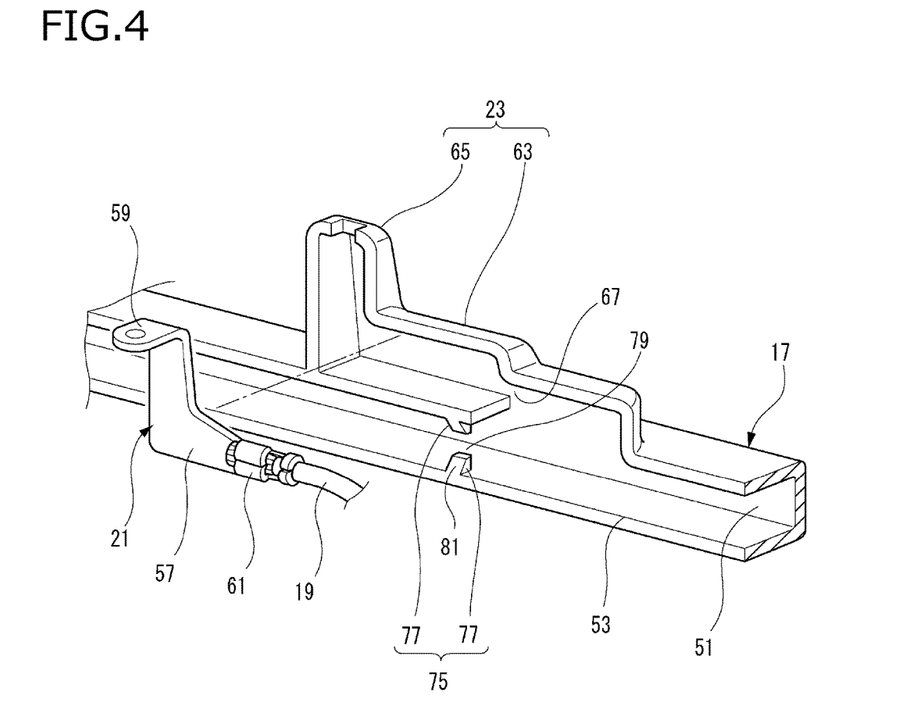
FIG. 4 is an enlarged view of an important part of a terminal retaining portion shown in FIG. 3.

FIG. 4 is an enlarged view of an important part of each of terminal retaining portions 23 shown in FIG. 3.

Each of the voltage detecting terminals 21 includes a terminal body portion 57, an electric contact portion 59 and a conductor connecting portion 61. The terminal body portion 57 is formed into an L-shape in side view. The electric contact portion 59 is bent from an upper end of the terminal body portion 57 toward the connection conductor 25 so as to be parallel with the connection conductor 25. The conductor connecting portion 61 is formed at a proximal end of the terminal body portion 57. A conductor of the voltage detecting line 19 is connected to the conductor connecting portion 61 by crimping etc.

The terminal retaining portions 23 are formed in positions (four places in the embodiment) corresponding to the connection conductors 25 respectively in the protector 17. The terminal retaining portions 23 are formed to have an L-shaped bulge on an upper face of the protector 17. Each of the terminal retaining portions 23 includes an electric wire leading-out portion 63 at its lower portion, and a terminal supporting portion 65 at its upper portion.

The electric wire leading-out portion 63 is formed into a horizontally long stepwise shape and communicates with the U-groove 51. The electric wire leading-out portion 63 leads the one end of the voltage detecting line 19 from the U-groove 51 of the protector 17 inserted into the recessed groove 15, to the terminal supporting portion 65 through a connecting hole 67. The terminal supporting portion 65 erects from the electric wire leading-out portion 63 to be vertically long. The terminal supporting portion 65 internally houses the voltage detecting terminal 21 connected to the one end of the voltage detecting line 19 led out of the electric wire leading-out portion 63. Faces of the electric wire leading-out portion 63 and the terminal supporting portion 65 opposed to the outer wall 41 of the case 13 are opened.

Figure 5:
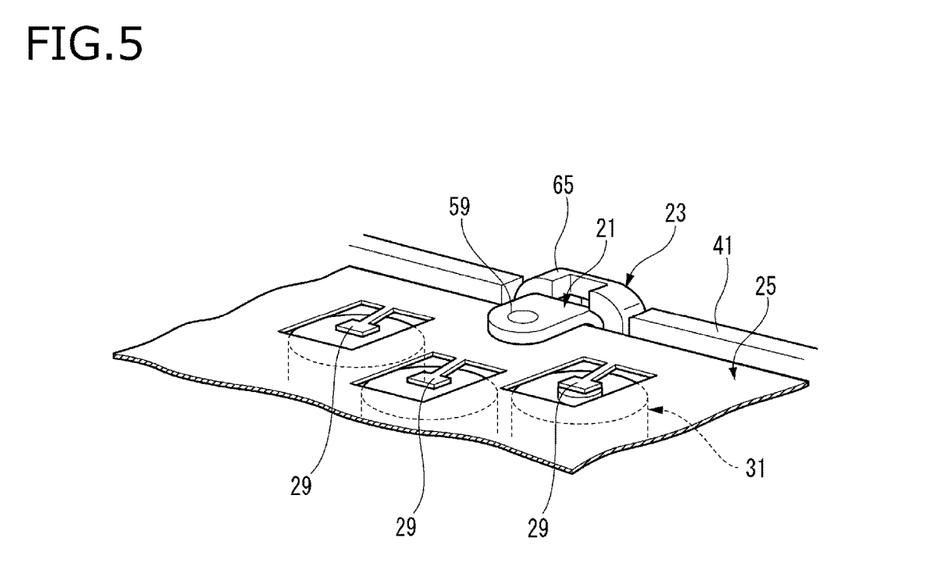
FIG. 5 is a perspective view of a voltage detecting terminal positioned in a contactable state with a connection conductor.

FIG. 5 is a perspective view of each of the voltage detecting terminals 21 positioned contactably with the connection conductor 25.

As shown in FIG. 5, the terminal supporting portion 65 is disposed to have its upper end higher than the outer wall 41 of the case 13 in a state in which the protector 17 has been inserted into the recessed groove 15 completely. The terminal supporting portion 65 is disposed so that from an opened side portion of the terminal supporting portion 65 at a higher position than the outer wall 41, the electric contact portion 59 of the voltage detecting terminal 21 extends over the connection conductor so as to be parallel therewith. That is, in a state in which the protector 17 has been inserted into the recessed groove 15, the terminal supporting portion 65 leads the electric contact portion 59 of the voltage detecting terminal 21 out of the protector 17 and positions the electric contact portion 59 of the voltage detecting terminal 21 contactably with an upper face of the connection conductor 25. The electric contact portion 59 positioned in a contactable state with the connection conductor 25 is electrically bonded to the connection conductor 25, for example, by welding.

Figure 6:
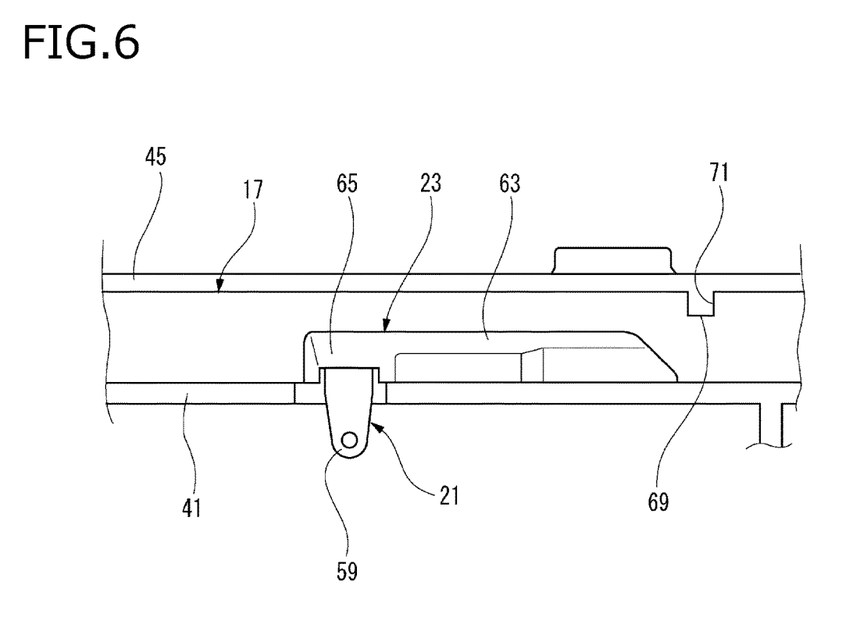
FIG. 6 is an enlarged view of a portion A in FIG. 1.

FIG. 6 is an enlarged view of a portion A in FIG. 1.

A positioning rib 69 is provided (provided protrusively) on the recessed groove 15 of the case 13 so as to protrude inward in the groove. The positioning rib 69 is formed as a protrusive ridge extending in an up/down direction (depth direction of the recessed groove 15) on an inner side face in the side wall 45 of the recessed groove 15. That is, the positioning rib 69 extends in an insertion direction of the protector 17. In the embodiment, the positioning rib 69 is provided at one place in a central portion in the extension direction of the recessed groove 15. However, the position of the positioning rib 69 or the number of positioning ribs 69 is not limited thereto.

On the other hand, a positioning recess 71 accepting the positioning rib 69 is provided in the protector 17, as shown in FIG. 3. A bottom plate 73 (see FIG. 7) of the U-groove 51 of the protector 17 is notched in the up/down direction (depth direction of the recessed groove 15) so that the positioning recess 71 is formed. When the positioning recess 71 is engaged with the positioning rib 69, the protector 17 is positioned in a prescribed position relatively to the case 13.

Further, in the protector 17, a jumping-out restraining claw 75 is formed at the U-groove 51, as shown in FIG. 4. The jumping-out restraining claw 75 includes a pair of claw protrusions 77 which protrude from respective U-groove inner wall faces of the U-groove 51 toward opposite U-groove inner wall faces thereto. A gap is formed between protruding front ends of the pair of claw protrusions 77. The gap serves as an insertion opening 79 when the voltage detecting line 19 is inserted into the U-groove 51. Faces of the claw protrusions 77 on an outer side of the U-groove 51 serve as introduction inclined faces 81 facing the gap, and faces of the claw protrusions 77 on an inner side of the U-groove 51 serve as flat faces parallel with the bottom plate 73 of the U-groove 51. The voltage detecting line 19 passing through the jumping-out restraining claw 75 to be routed in the U-groove 51 is restrained from jumping out of the groove by the flat faces of the claw protrusions 77.

Figure 7:
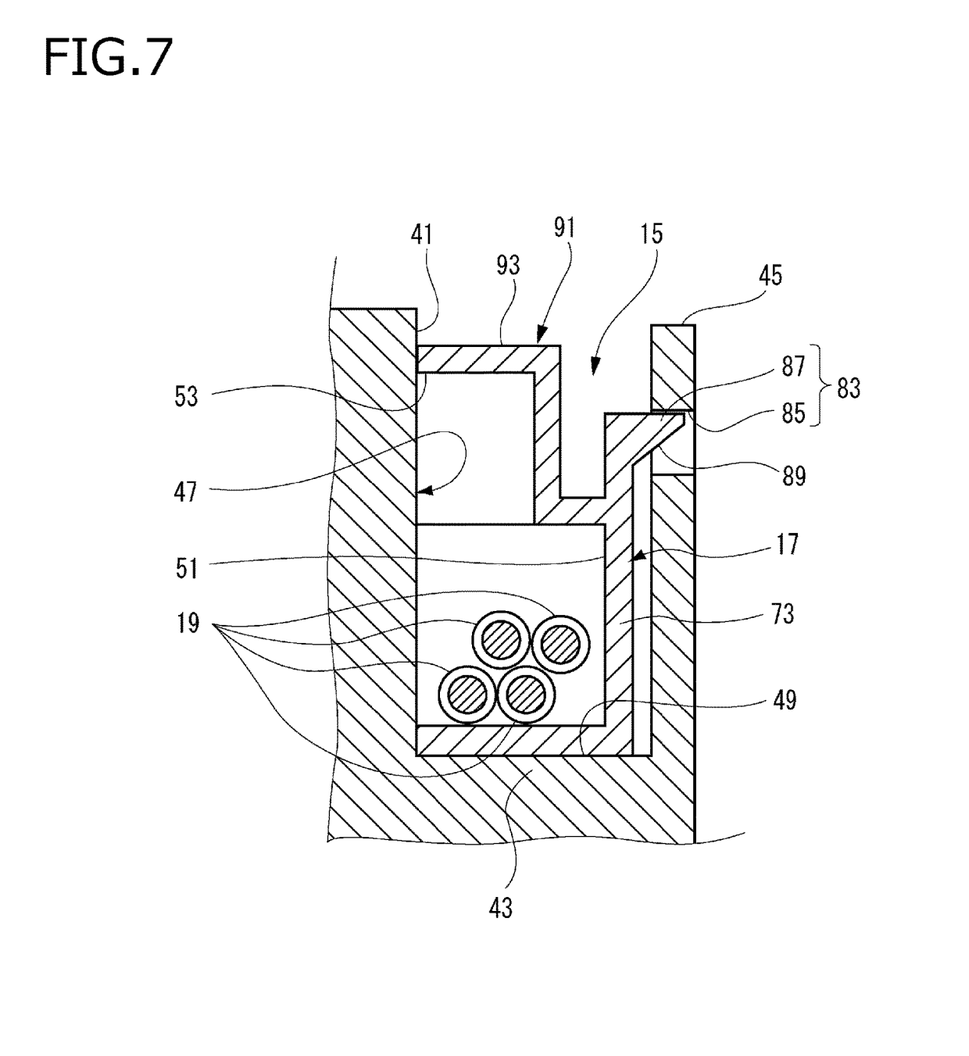
FIG. 7 an enlarged sectional view of a lock mechanism.

As shown in FIG. 7, each of lock mechanisms 83 for restraining the protector 17 from separating from the recessed groove 15 is provided between the case 13 and the protector 17. For example, the lock mechanism 83 includes a lock hole 85 and a lock claw 87. The lock hole 85 is provided in one of the case 13 and the protector 17. The lock claw 87 is provided in the other of the case 13 and the protector 17. In the embodiment, in the lock mechanism 83, the lock hole 85 is pierced in the case 13 and the lock claw 87 is provided protrusively on the protector 17. Incidentally, the lock mechanism according to the present invention is not limited to the lock mechanism 83 in the embodiment. It is a matter of course that the lock mechanism may use various forms.

The lock claw 87 extends from the bottom plate 73 of the protector 17 and on an opposite side to the insertion direction of the protector 17, and has an extending front end protruding toward the side wall 45 of the recessed groove 15. A lower face of the thus protruding lock claw 87 serves as an inclined face 89. When the protector 17 is inserted into the recessed groove 15, the inclined face 89 abuts against an upper end of the side wall 45 of the recessed groove 15 and acts to bend the lock claw 87. When the protector 17 is inserted to reach the bottom of the recessed groove 15, the lock claw 87 bent due to the inclined face 89 is elastically restored to be locked into the lock hole 85. When the lock claw 87 is locked into the lock hole 85, the lock mechanism 83 locks the protector 17 to the recessed groove 15 so that the protector 17 is restrained from separating from the recessed groove 15. In the embodiment, lock mechanisms 83 are provided at three places in the longitudinal direction of the protector 17 and the recessed groove 15. However, the number of the lock mechanisms 83 is not limited thereto.

In addition, a pressing portion 91 is provided in the vicinity of each of the lock claws 87 in the protector 17. The pressing portion 91 is formed into a trapezoidal shape whose top serves as a pressing planar face 93. The pressing planar face 93 of the pressing portion 91 is disposed to be higher than an upper end of the lock claw 87. The pressing portion 91 is disposed to be lower than an opening of the recessed groove 15 in a state in which the protector 17 has been inserted into the recessed groove 15 completely. When the pressing planar face 93 of the pressing portion 91 is pressed by a worker's finger, the lock claw 87 is locked into the lock hole 85 easily. That is, the pressing portion 91 increases visibility of the lock place, and has a function of making it possible to perform lock work of locking the lock claw 87 into the lock hole 85 easily.

Next, an assembling procedure of the conductor module attachment structure having the aforementioned configuration will be described.

The conductor module 100 is assembled as follows. That is, a voltage detecting line 19 with a voltage detecting terminal 21 is attached to a protector 17 in advance. After the voltage detecting terminal 21 in the voltage detecting line 19 with the voltage detecting terminal 21 is inserted into a terminal supporting portion 65 in a terminal retaining portion 23 of the protector 17, the voltage detecting line 19 connected to the voltage detecting terminal 21 is inserted into a U-groove 51. On this occasion, the voltage detecting line 19 is inserted into the U-groove 51 through a gap of a jumping-out restraining claw 75. Thus, the voltage detecting line 19 can be easily restrained from separating from the U-groove 51. In a similar manner or the same manner, all voltage detecting lines 19 with voltage detecting terminals 21 are attached to the protector 17.

When all the voltage detecting lines 19 with the voltage detecting terminals 21 are attached, preliminary attachment of the protector 17 is completed. Thus, the voltage detecting terminals 21 and the voltage detecting lines 19 can be preliminarily attached to the protector 17 integrally in advance in the conductor module 100 having the conductor module attachment structure according to the embodiment.

The protector 17 to which the voltage detecting terminals 21 and the voltage detecting lines 19 have been attached preliminarily is inserted into a recessed groove 15 of a case 13 in which a plurality of single batteries 31 and a plurality of connection conductors 25 have been housed. The protector 17 is inserted into the recessed groove 15 with a U-groove side used as an insertion-direction front end side and a terminal retaining portion side used as an insertion-direction rear end side. In addition, the protector 17 is inserted into the recessed groove 15 so that a positioning recess 71 of the protector 17 is aligned with a positioning rib 69 of the recessed groove 15 during the insertion.

When the protector 17 is inserted into the recessed groove 15 to reach a predetermined depth, lock claws 87 of the protector 17 abut against an upper end of a side wall 45 in the recessed groove 15. In this state, pressing planar faces 93 of the protector 17 are pressed so that the protector 17 can be further pushed into the recessed groove 15. The lock claws 87 are elastically deformed in a separation direction from the side wall 45 to bend more inward in the recessed groove 15. When the protector 17 is inserted to reach the prescribed position, the lock claws 87 are aligned with lock holes 85. The lock claws 87 aligned with the lock holes 85 to be elastically restored are locked into the lock holes 85. The protector 17 is attached to the case 13 completely due to the lock of the lock mechanisms 83.

Next, effects of the aforementioned configuration will be described.

In the conductor module attachment structure according to the embodiment, the voltage detecting lines 19 having the voltage detecting terminals 21 at their one ends are housed in the U-groove 51 of the protector 17. Due to the terminal retaining portions 23 of the protector 17, the voltage detecting terminals 21 together with the one ends of the voltage detecting lines 19 are led out of the U-groove 51 and positioned and retained in prescribed positions of the protector 17.

The protector 17 to which the voltage detecting lines 19 and the voltage detecting terminals 21 have been attached is inserted into the recessed groove 15 provided protrusively on the case 13. When the protector 17 is inserted into the recessed groove 15, the opening portion 53 of the U-groove 51 is closed by the inner wall face 47 of the recessed groove 15. That is, since the opening portion 53 in the protector 17 is closed, the voltage detecting lines 19 are housed in a closed space defined by the U-groove 51 and the recessed groove 15. Simultaneously, the protector 17 is inserted into the recessed groove 15 completely. Thus, the voltage detecting terminals 21 retained by the terminal retaining portions 23 are positioned contactably with the connection conductors 25 provided in the case 13.

In the conductor module attachment structure according to the embodiment, when the protector 17 to which the voltage detecting lines 19 with the voltage detecting terminals 21 have been attached preliminarily is inserted into the recessed groove 15 of the case 13, the protector 17 is completely mounted. Thus, the voltage detecting lines 19 is completely housed. Simultaneously, the voltage detecting terminals 21 are completely ready for connection to the connection conductors 25.

Therefore, an insulating cover (a side cover or a coating member) as a separate component, a hinge cover, or the like, only for the purpose of covering the exposed voltage detecting lines 19 can be dispensed with. As a result, the structure can be made simple. In addition, troublesome electric wire housing work of attaching the insulating cover or locking the hinge cover after the voltage detecting lines 19 are routed can be dispensed with. As a result, routing work of the voltage detecting lines 19 can be performed easily. Further, the voltage detecting terminals 21 are positioned simultaneously with the mounting of the protector 17. Accordingly, a complicated terminal positioning structure for positioning the voltage detecting terminals 21 relatively to the connection conductors 25 also does not have to be formed in the case 13. As a result, the structure of the case 13 can be made simple and the voltage detecting terminals 21 can be positioned easily.

In addition, in the conductor module attachment structure according to the embodiment, when the protector 17 to which the voltage detecting lines 19 with the voltage detecting terminals 21 have been attached preliminarily is inserted into the recessed groove 15 of the case 13, the positioning recess 71 of the protector 17 is engaged with the positioning rib 69 of the case 13. Due to the engagement between the positioning recess 71 and the positioning rib 69, the protector 17 is positioned in the prescribed position relatively to the case 13. When the protector 17 is positioned thus, the voltage detecting terminals 21 retained in the terminal retaining portions 23 are brought into a contactable state with the prescribed positions of the connection conductors 25 provided in the case 13.

In addition, in the conductor module attachment structure according to the embodiment, the voltage detecting lines 19 routed in the U-groove 51 of the protector 17 are restrained from jumping out of the U-groove 51 by the jumping-out restraining claws 75 provided in the U-groove 51. As a result, the voltage detecting lines 19 can be prevented, for example, from getting stuck when the protector 17 to which the voltage detecting lines 19 with the voltage detecting terminals 21 have been attached preliminarily is inserted into the recessed groove 15. Thus, insertion workability of the protector 17 can be made excellent.

Further, in the conductor module attachment structure according to the embodiment, when the protector 17 to which the voltage detecting lines 19 with the voltage detecting terminals 21 have been attached preliminarily is inserted into the recessed groove 15 completely, the lock claws 87 are locked into the lock holes 85 of the lock mechanisms 83 so that the protector 17 can be restrained from separating from the recessed groove 15. Since the lock mechanisms 83 locks the protector 17 into the recessed groove 15, the lock mechanisms 83 not only can retain the voltage detecting lines 19 in a protected state but also can retain the voltage detecting terminals 21 in a positioned state relatively to the connection conductors 25.

Consequently, according to the conductor module attachment structure according to the embodiment, it is unnecessary to form a hinge cover on the case 13 or provide an insulating cover as a separate component so that it is possible to reduce the number of work man-hours or cost.

The present invention is not limited to the aforementioned embodiment. It is also intended by the present invention to combine respective constituents of embodiments with one another, or for those skilled in the art to make changes or applications thereon based on the description of the present invention and well-known techniques. Therefore, those combinations, changes and applications should be included in the scope for which protection is sought.

For example, in the aforementioned configuration example, the case where the electric contact portions 59 of the voltage detecting terminals 21 are electrically bonded to the connection conductors 25 by welding has been described. However, the conductor module attachment structure according to the present invention may be configured so that the voltage detecting terminals and the connection conductors are electrically connected to each other respectively by another connection structure such as fastening using bolts and nuts. Thus, the conductor module attachment structure according to the present invention does not receive any limitation as to the connection structure between the voltage detecting terminals and the connection conductors. Accordingly, the degree of freedom for the attachment structure can be increased.

Here, features of the aforementioned conductor module attachment structure according to the embodiment of the present invention will be summarized and listed briefly in the following [1] to [4] respectively.

[1] A conductor module attachment structure including:

a case (13) which includes connection conductors (25) for electrically connecting a plurality of single batteries (31);

a recessed groove (15) which is provided protrusively on an outer wall (41) of the case (13) and extends along the outer wall (41);

a protector (17) which extends along the recessed groove (15) and is formed into a U-shape in section perpendicular to a longitudinal direction of the protector (17) so as to have a U-groove and that is configured that an opening portion (53) of the U-shape is closed by an inner wall face (47) of the recessed groove (15) when the protector (17) is inserted into the recessed groove (15) so;

a voltage detecting line (19) which is routed in the U-groove (51) of the protector (17);

a voltage detecting terminal (21) which is connected to one end of the voltage detecting line (19); and a terminal retaining portion (23) which is provided on the protector (17) and which leads the one end of the voltage detecting line (19) out of the U-groove (51) of the protector (17) in the recessed groove (15), and position the voltage detecting terminals (21) contactably with the connection conductors (25).

[2] A conductor module attachment structure according to the aforementioned [1], wherein:

a positioning rib (69) which extends in an insertion direction of the protector (17) into the recessed groove (15) is provided protrusively on the recessed groove (15); and a positioning recess (71) which is configured to engage with the positioning rib (69) to position an attachment position of the protector (17) relatively to the case (13) is provided on the protector (17).

[3] A conductor module attachment structure according to the aforementioned [1] or [2], wherein:

a jumping-out restraining claw (75) which restrains the routed voltage detecting line (19) from jumping out is provided at the U-groove (51) in the protector (17).

[4] A conductor module attachment structure according to any one of the aforementioned [1] to [3], wherein:

a lock mechanism (83) which restrains the protector (17) from separating from the recessed groove (15) is provided between the case (13) and the protector (17).

What is claimed is:

1. A conductor module attachment structure comprising:

a case that includes a connection conductor for electrically connecting a plurality of single batteries;

a recessed groove that is provided protrusively on an outer wall of the case and extends along the outer wall;

a protector that extends along the recessed groove and is formed into a U-shape in section perpendicular to a longitudinal direction of the protector so as to have a U-groove and that is configured that an opening portion of the U-groove of the protector is closed by an inner wall face of the recessed groove when the protector is inserted into the recessed groove;

a voltage detecting line that is routed in the U-groove of the protector;

a voltage detecting terminal that is connected to one end of the voltage detecting line; and a terminal retaining portion that is provided on the protector and that leads the one end of the voltage detecting line out of the U-groove of the protector in the recessed groove and positions the voltage detecting terminal contactably with the connection conductor.

2. The conductor module attachment structure according to claim 1, wherein a positioning rib that extends in an insertion direction of the protector into the recessed groove is provided protrusively on the recessed groove; and wherein a positioning recess that is configured to engage with the positioning rib to position an attachment position of the protector relatively to the case is provided on the protector.

3. The conductor module attachment structure according to claim 1, wherein a jumping-out restraining claw that restrains the routed voltage detecting line from jumping out is provided at the U-groove in the protector.

4. The conductor module attachment structure according to claim 1, wherein a lock mechanism which restrains the protector from separating from the recessed groove is provided between the case and the protector.

* * * * *